Oct. 6, 1970 C. A. LEE ET AL 3,532,598
METHOD AND APPARATUS FOR CONTROLLING THE DISTRIBUTION
OF THE RATE OF FLOW OF PAPERMAKING FIBERS
Filed March 29, 1967 5 Sheets-Sheet 1

INVENTORS
CHARLES A. LEE
WARREN R. FURBECK

BY Anderson, Luedeka, Fitch, Even & Tabin
ATTORNEYS

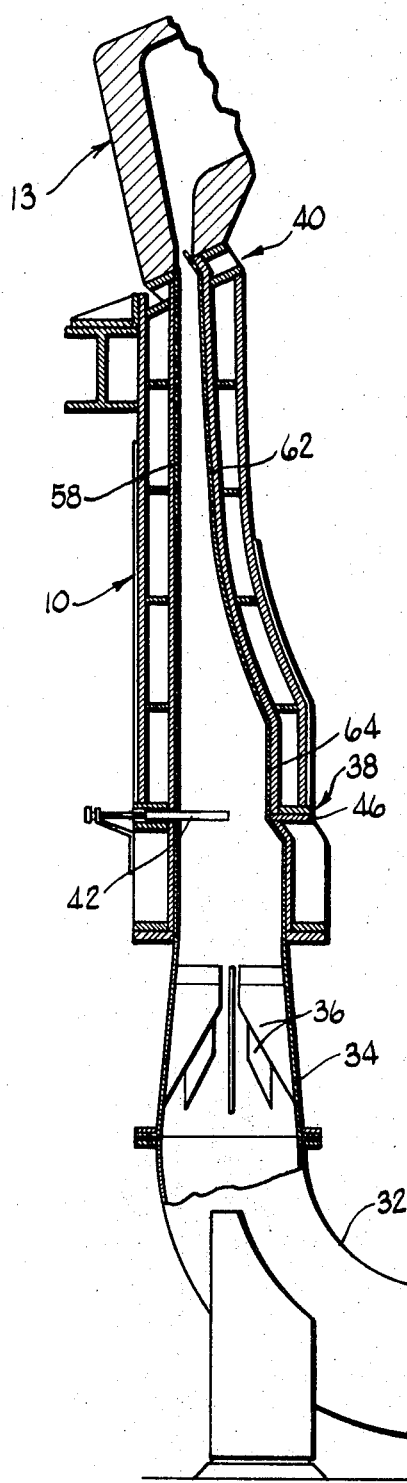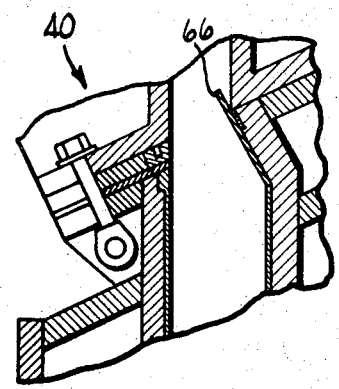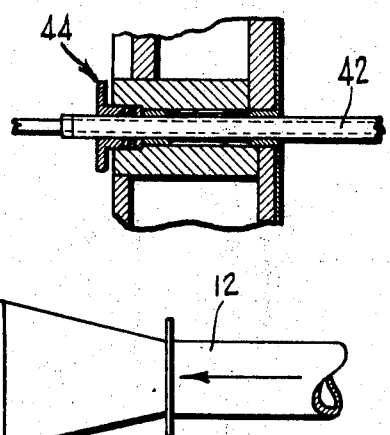

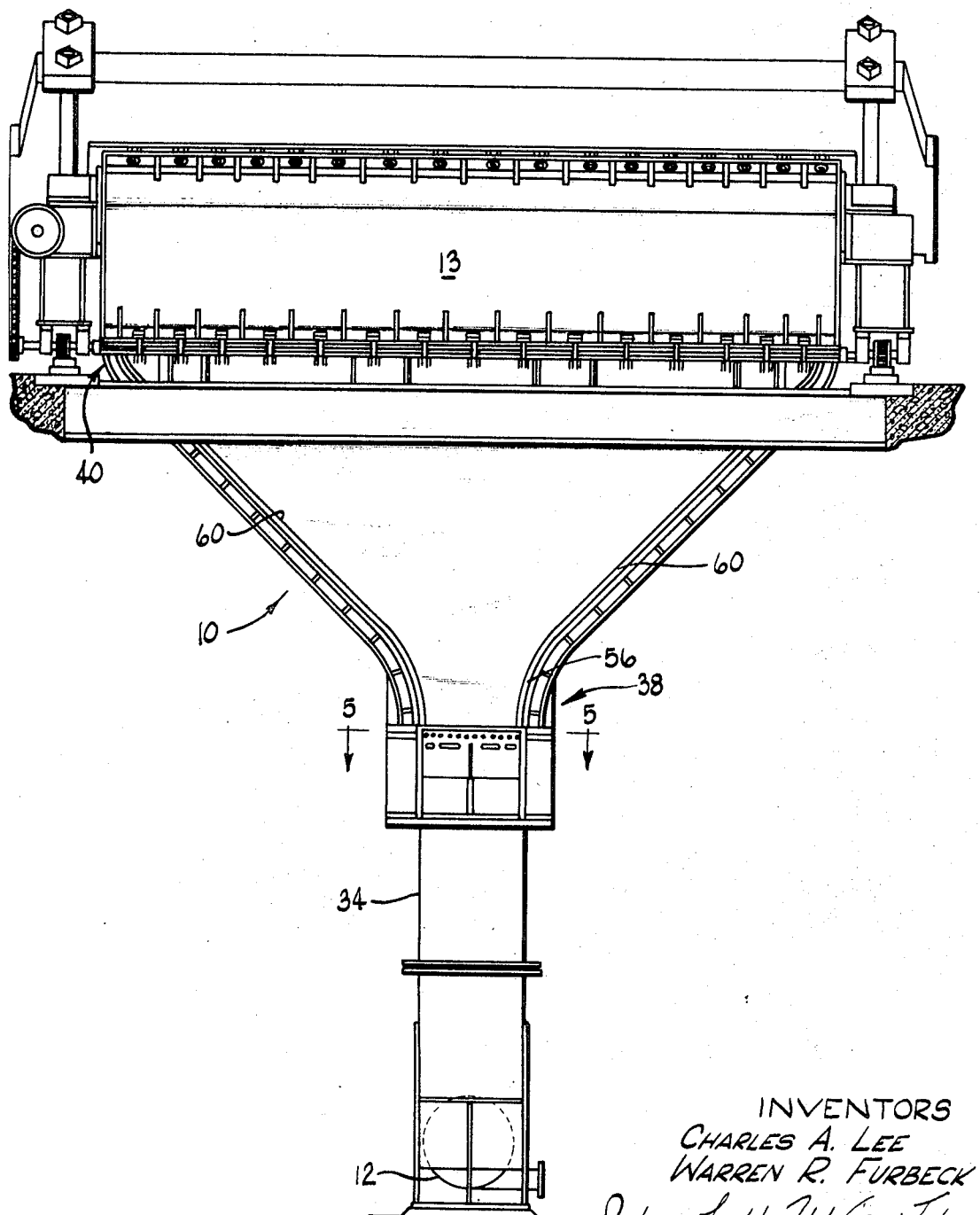

Oct. 6, 1970    C. A. LEE ET AL    3,532,598
METHOD AND APPARATUS FOR CONTROLLING THE DISTRIBUTION
OF THE RATE OF FLOW OF PAPERMAKING FIBERS
Filed March 29, 1967    5 Sheets-Sheet 4
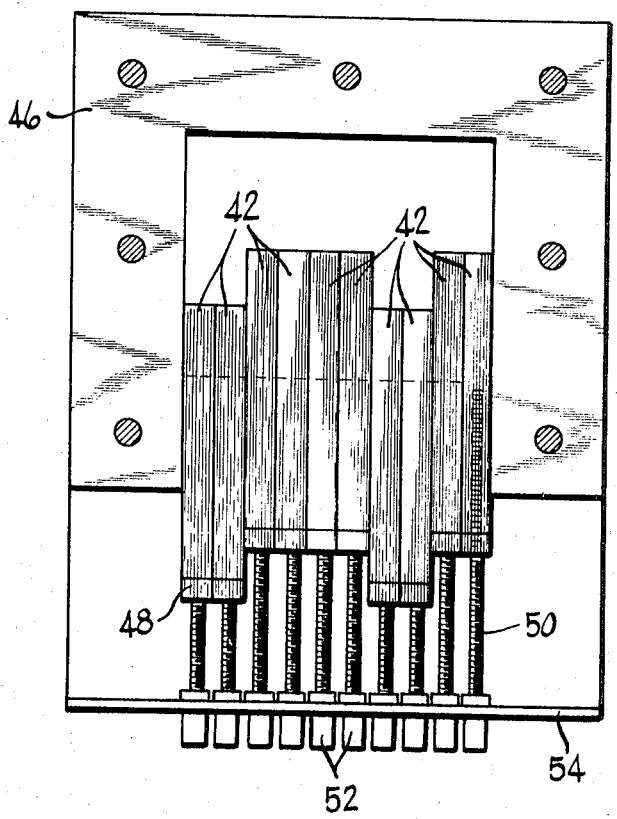
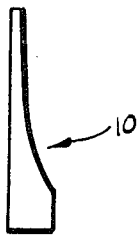
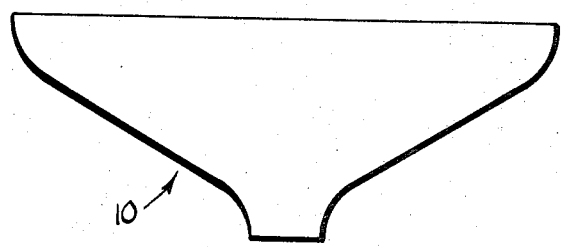
INVENTORS
CHARLES A. LEE
WARREN R. FURBECK
BY Anderson, Luedeka, Fitch, Even & Tabin
ATTORNEYS

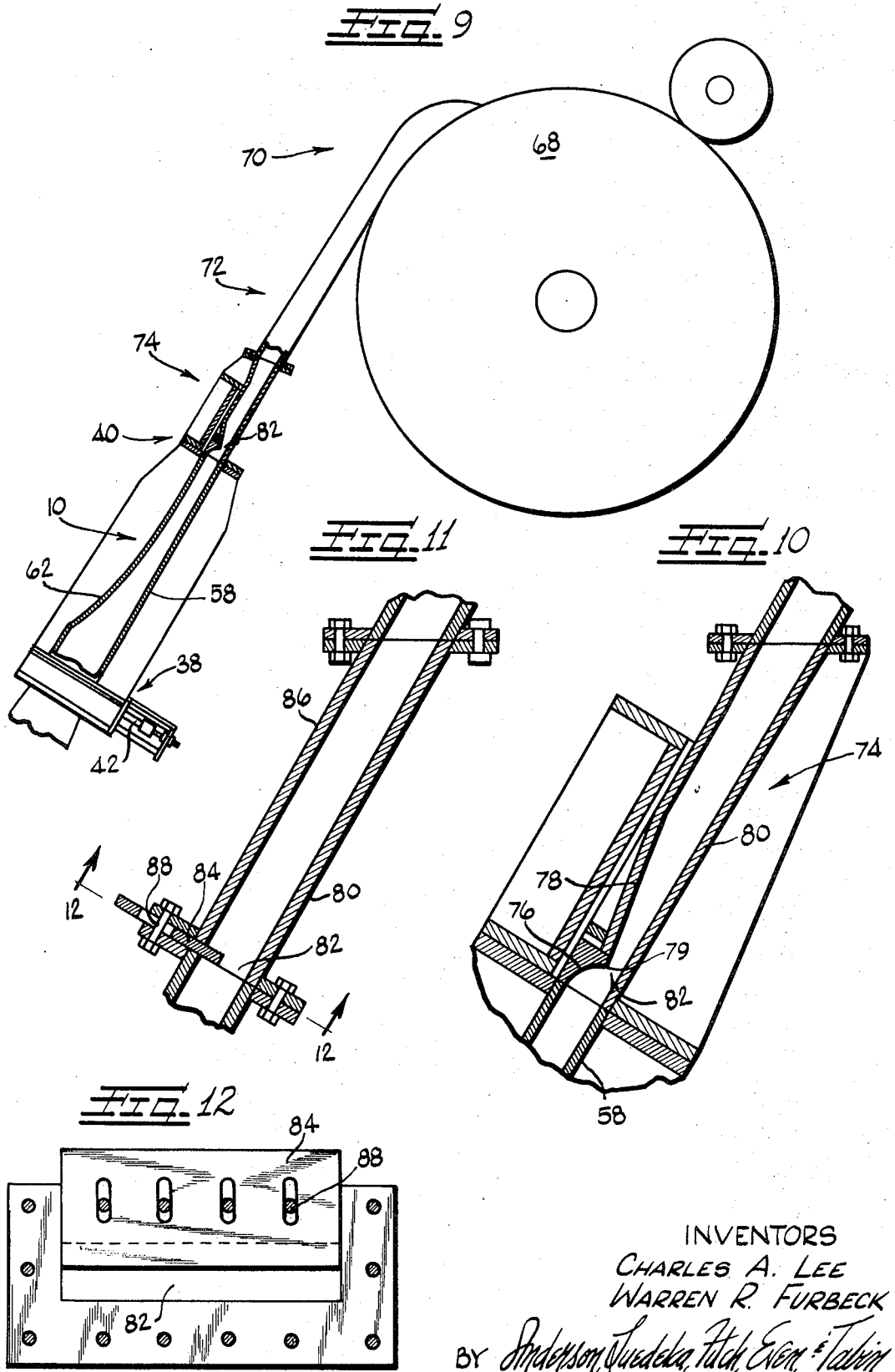

3,532,598
METHOD AND APPARATUS FOR CONTROLLING THE DISTRIBUTION OF THE RATE OF FLOW OF PAPERMAKING FIBERS
Charles A. Lee and Warren R. Furbeck, Knoxville, Tenn., assignors, by mesne assignments, to International Paper Company, New York, N.Y., a corporation of New York
Filed Mar. 29, 1967, Ser. No. 626,823
Int. Cl. D21f 1/06
U.S. Cl. 162—216    14 Claims

ABSTRACT OF THE DISCLOSURE

A flow spreader for a papermaking machine is used to widen the flow of a suspension of papermaking fibers from a narrow stream to the width of the paper to be made. The flow spreader is shaped to provide a steady flow over a wide range of flow rates and suspension composition. A plurality of members are disposed side by side across the inlet end of the flow spreader to constrict the flow at selected positions thereacross to control the distribution of flow rates at the outlet end. A resistance gap at the outlet end may be used to make the flow unidirectional and introduce turbulence.

---

This invention relates to a method and apparatus for controlling the distribution of the rate of flow of paper stock across the width of flow. More particularly, it relates to a flow spreader for supplying the stock uniformly to the forming section of a papermaking machine. More partcularly, it relates to a flow spreader for taking the flow of stock from a relatively round or square pipe and distributing it evenly over a wide flow. It still more particularly relates to such a flow spreader wherein the distribution may be controlled to provide uniform flow and wherein the flow from the outlet end of the flow spreader is substantially unidirectional.

In making paper, it is ordinarily desirable that the paper be made uniform. This requires that the papermaking fibers be laid down uniformly upon the carrier on which the paper is formed. In order to lay the papermaking fibers down uniformly, it is generally necessary that a homogenous suspension of the fibers be evenly distributed across the carrier. The suspension is ordinarily applied to the carrier from a headbox through a slice. In order that the flow from the headbox be uniform across the width of the carrier, it is helpful if the inlet into the headbox provides for uniform distribution of the fibers.

The present invention is directed to a flow spreader for delivering a substantially homogenous mixture of papermaking fibers in an aqueous suspension into the headbox substantially uniformly across its inlet. The invention is also applicable to supplying stock across the inlet of the rotoformer type. It is well known in the prior art to provide fan-shaped flow spreaders wherein the papermaking stock is taken from a round conduit and distributed over a wide area. One of the great difficulties with flow spreaders of the prior art has been that they produced such instability and turbulence in the flow that the distribution could not be controlled. The discharge from the flow spreader was therefore often uneven, resulting in uneven distribution of the fibers in the paper and hence an undesirable paper product.

In accordance with the present invention, a fan-shaped flow spreader is provided which is relatively stable and produces a steady flow of the suspension of fibers without substatnial turbulence. A plurality of flow control members is disposed across the flow spreader at its inlet. In a preferred form of the invention, these flow control members comprise parallel finger-like bars disposed by side across the width of the inlet end of the flow spreader and selectably movable in a direction normal to the flow of the stock through the inlet end. The insertion or removal of the fingers controls the distribution of the stock across the flow spreader and permits a substantially equalized rate of flow of stock to be established across the entire width of the outlet of the flow spreader. That is, for each unit of width across the machine, the rate of flow is the same. In some installations it is necessary or desirable that the flow from the flow spreader be substantially unidirectional without lateral components. Under such circumstances, means in the form of a restricted orifice may be provided to reduce the relative magnitude of any lateral components. Means, such as a restricted orifice may be used to produce desired turbulence at the outlet end of the flow spreader.

It is therefore a primary object of the present invention to supply a homogeneous suspension of papermaking fibers uniformly across the forming section of a papermaking machine. Another object of the invention is to provide a flow spreader in which a steady flow is established in the flow spreader at various flow rates and stock compositions and in which the distribution of the flow across the outlet of the flow spreader may be controlled. Still another object of the invention is to provide such control in the form of selectably movable members disposed at respective positions across the inlet of the flow spreader. A still further object of the invention is to provide a flow spreader wherein the flow is substantially unidirectional at the outlet thereof. Another object is to provide turbulence at the outlet of a flow spreader in which there is steady flow.

Other objects and advantages of the invention will become apparent from consideration of the following detailed description, particularly when taken in conjunction with the accompanying drawings, in which:

FIG. 2 is an enlarged view, partly in section, of the flow spreader shown in FIG. 1 and showing the flow control members;

FIG. 3 is a rear view of the apparatus shown in FIG. 2, showing the bottom of the flow spreader;

FIG. 4 is an enlarged view of one of the flow control members shown in FIG. 2;

FIG. 5 is an enlarged top view showing the flow control members and taken along section line 5—5 of FIG. 3;

FIG. 6 is an enlarged view of the outlet end of the flow spreader shown in FIG. 2;

FIG. 7 is an illustration of the shape of the top and bottom views of a 120° flow spreader made in accordance with the present invention;

FIG. 8 is an illustration of the shape of the side view of the flow spreader shown in FIG. 7;

FIG. 9 is a side elevation, partly in section, of another form of papermaking machine using the flow spreader of the present invention;

FIG. 10 is an enlarged view of the resistance gap shown in FIG. 9;

FIG. 11 is an enlarged view of another form of resistance gap; and

FIG. 12 is a view of the resistance plate shown in FIG. 11 taken along line 12—12 in FIG. 11.

Figure 1:
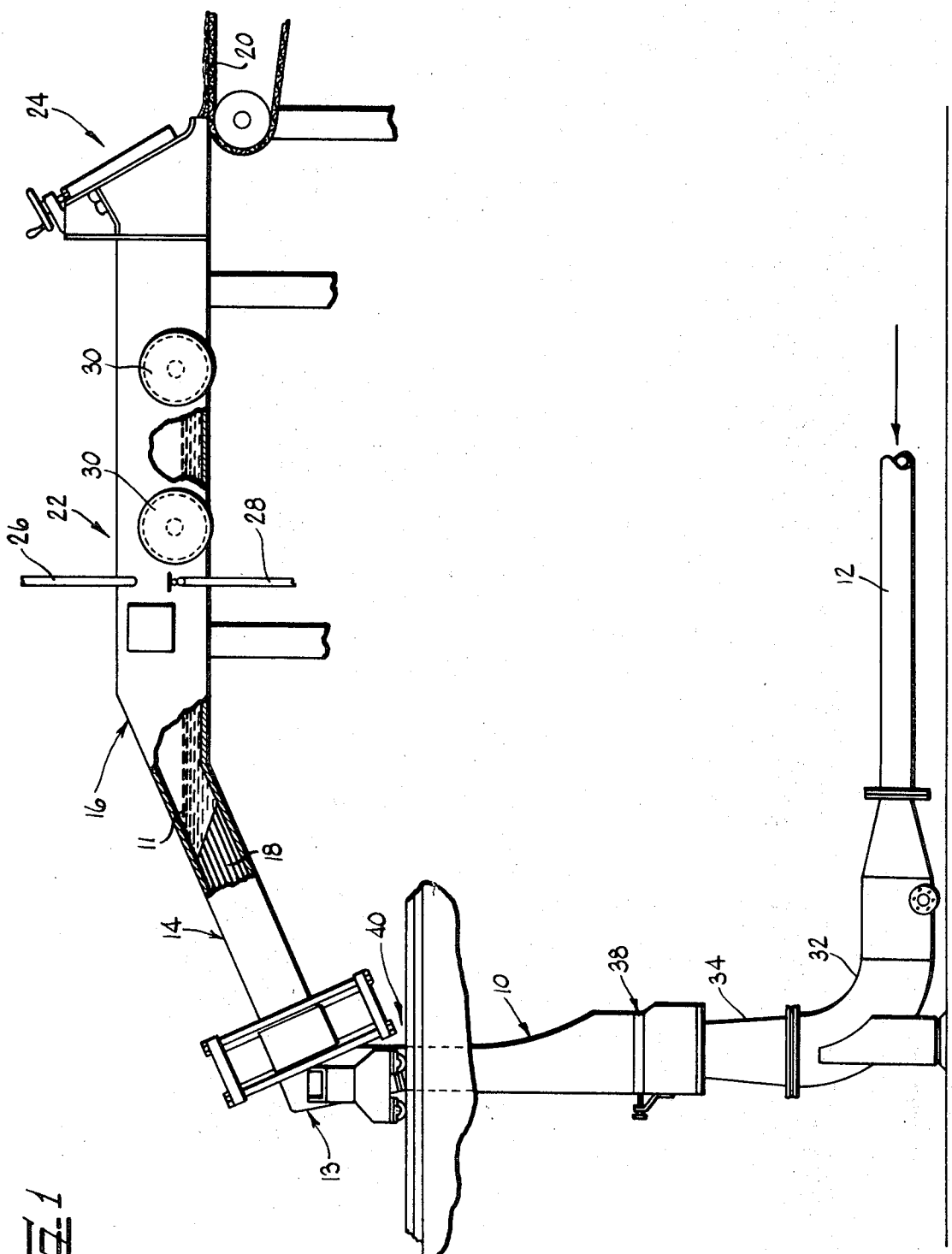
FIG. 1 is a side elevation, partly in section, of a papermaking machine showing the preferred form of flow spreader according to the present invention.

In FIG. 1 is shown a papermaking machine including a flow spreader 10 of the present invention. As shown in FIG. 1, paper stock 11 in the form of an aqueous suspension of papermaking fibers is supplied through a round conduit or pipe 12 to the flow spreader 10 which spreads the flow into a wide thin stream and supplies it to a distribution or mixing chamber 13 which acts to assure appropriate turbulence in the stock which is then directed into the inlet section 14 of a headbox 16.

In the particular papermaking machine shown, the interior of the inlet channel 14 contains a plurality of relatively small straight tubes 18 disposed parallel to the longitudinal axis of the inlet section 14. The outlet end of the flow spreader 10, the distribution chamber 13, the inlet section 14, and indeed, the entire headbox 16 are of substantially the same width as the wire 20 upon which the stock suspension 11 is deposited to form the paper web. The discharge end of the inlet section 14 joins a relatively long horizontally disposed channel portion 22 formed from metal plates having a smooth inner surface and provided at its discharge end with an adjustable slice assembly diagramatically illustrated at 24. The slice assembly 24 itself may be of any suitable construction and may include a slice lip and apron between which the suspension 11 flows out of the headbox 16 onto the wire 20. In the illustrated embodiment of the invention, the headbox is shown as it would be fabricated to operate as a pressure headbox in which the depth of flow of the fiber suspension in the horizontal channel 22 is less than the overall depth of the channel. When such design is employed, means are provided for maintaining air pressure above the flowing fiber suspension 11 and may comprise an inlet pipe 26 opening into the channel 22 and connected with a suitable source of compressed air (not shown). In order that proper control may be effected on the stock flowing under pressure through the channel 22, a bleeder pipe 28 of relatively small diameter is affixed to one wall of the channel 22 at the height of the desired depth of flow of the stock suspension 11.

The headbox as illustrated in FIG. 1 and as just described is well known. It is designed for so-called frozen flow operation. Frozen or plug flow is characterized by a thin shear zone adjacent to any surface of the channel 22 in contact with the stock 11. The fibers tend to roll or shear past one another in this zone while the remainder of the cross section of the flowing suspension appears to be frozen in a solid block moving parallel to the axis of the channel and with uniform velocity through its cross section. This frozen flow operation reduces flocculation of the fibers which might produce a floc pattern which might be retained through the slice orifice and in the paper. Should some flocculation occur, the papermaking machine may include rotatable deflocing rolls 30. The distribution chamber 13 utilized with a headbox of the sort illustrated in the drawings is described in greater detail in the copending application of Lee and Murphy, Ser. No. 479,797, filed Aug. 16, 1965, now U.S. Pat. No. 3,445,331, issued May 20, 1969, for Fiber Suspension Distribution System. The function of the distribution chamber 13, as there described, is to provide a well-mixed fiber suspension and to distribute it evenly across the inlet section 14 of the headbox 16. In order that the distribution chamber 13 may function at its best, it is desirable that the flow spreader 10 provide a uniform distribution of stock across the entire width of the distribution chamber 13, this width being carried on through the headbox 16 to the forming wire 20. The distribution of the stock at the inlet to the distribution chamber 13 will now be described.

As before mentioned, the stock suspension 11 is supplied to the papermaking machine through a round conduit 12. In the particular machine illustrated, the stock flows around an elbow 32 and through a flow straightening section 34. In the process, the cross section of the flow is changed from circular to approximately square and the direction of flow from horizontal to vertical. The flow spreader 10 then converts the cross section from square to very wide and thin. The flow spreader 10 and other parts of the flow channel from the round conduit 12 to the distribution chamber 13 are shown in greater detail in FIGS. 2 and 3.

FIG. 2 shows the vanes 36 comprising the flow straightening section 34. They serve to provide a relatively straight flow of stock suspension 11 through a square cross section at the inlet end 38 of the flow spreader 10. As shown in FIG. 3 the flow spreader 10 fans out from its inlet end 38 to its outlet end 40, at the same time constricting in its other dimension so that the cross sectional area increases only gradually. Fan-shaped flow spreaders are known in the prior art. Frequently they include vanes near the inlet end of the flow spreader to distribute the stock suspension. Sometimes such vanes are made movable. The flow spreaders of the prior art have often proven particularly unstable, making it difficult to achieve the proper controlled distribution of stock.

In accordance with the present invention, a plurality of flow control members, in the form of fingers 42, are disposed side by side transversely across the width of the inlet end 38 of the flow spreader 10. For the purposes of this description, the dimension in the cross machine direction of the flow spreader 10 will be considered its width; the dimension in the direction of flow will be considered its length; and the other dimension will be considered its height. These fingers 42 are mounted in either the top or bottom of the inlet end 38, and may be mounted through seals 44, as shown particularly in FIG. 4, to prevent the outflow of stock suspension around the fingers 42. As shown more particularly in FIG. 5, the fingers are mounted in a plate structure 46 and have tapped caps 48 affixed thereto through which screws 50 are threaded. The screws 50 extend into the hollow fingers 42. Heads 52 are affixed to respective screws 50, so that when turned, they move the fingers in the desired direction upward across the flow through the inlet end 38. Selective turning of the heads 52 controls the constriction of flow at respective selected positions transversely across the inlet end 38. The heads 52 are rotatably secured to a flange 54 which in turn is secured to the plate 46.

The relatively disposition of the fingers produces the desired distribution of flow. The fingers obviously control the flow into the inlet end 38 of the flow spreader 10. However, more is required than merely the presence of the fingers. Such fingers have proven ineffective to control the flow at the outlet end of flow spreaders of the prior art because the flow was so turbulent or unstable as to overcome the effect of the fingers and precluded the controlled flow to carry through to the outlet end 40 of the flow spreader 10. Surprisingly, it has also been found undesirable to have a very stable flow spreader, for if the flow is particularly stable, the stability will overcome any aberrations created by the fingers 42, resulting in the same flow distribution irrespective of the disposition of the fingers. The flow spreader contour should provide a steady flow which must have a certain stability sufficient for controllable flow controlled by the fingers 42 without providing too much stability. A steady flow may be defined as flow wherein there is no variation with time in either magnitude or direction of the velocity vector at any stationary point in the space through which the fluid moves. The fluid flows along fixed flow lines wherein an element of fluid entering the inlet end 38 at a given flow line flows along that line to the outlet end 40.

A curved portion 56 at the inlet end 38 of the flow spreader 10 produces initial divergence of the stream. For the sake of reference, the view of the flow spreader 10 shown in FIG. 3 may be considered a bottom view. As shown particularly in FIG. 2, the bottom plate 58 of the flow spreader 10 is flat. The side plates 60 are relatively straight after the outwardly curved portion 56 and then are reversely curved at the outlet end 40 to terminate generally in the machine direction. The top plate 62 of the flow spreader 10 is generally curved to maintain a relatively constant cross sectional area of rectangular shape. With such configuration, the ratio of height to width decreases in the direction of flow. At the inlet end of the plate 62 is a flat section 64 parallel to the bottom plate 58. This flat section 64 extends over at least part of the curved portion 56 of the side walls so that the downward motion of the flow does not begin until after there has been lateral divergence. By downward is meant directed toward the bottom plate 58.

A flow spreader was built having substantially the relative dimensions shown in FIGS. 2 and 3. It was found that the stability of the flow spreader was increased by moving the top and bottom plates closer together thus providing decreasing area of flow cross section. However, this made the flow so stable as to impede control of flow by the fingers 42. Therefore, the spacing between the top and bottom plates was adjusted to provide the stability permitting control of the flow at the outlet end 40 by the fingers 42 at the inlet end. The cross section of the flow was rectangular with the area increasing gradually throughout the length of the flow spreader 10. This provided steady flow over a wide range of flow rates and suspension composition and with the same desired flow pattern at all flow rates. It may be noted that the flow spreader 10, as shown, is entirely open from inlet end to outlet end. There are no control vanes or other flow directors. The stream is directed in the flow spreader entirely by the shape of the flow spreader walls and by the control fingers 42. In fact, it has been found that the control fingers 42 are more effective without such vanes as have been used in flow spreaders of the prior art.

The outlet end 40 of the flow spreader 10 is shown in greater detail in FIG. 6. It may include means such as the plate 66 for forming an orifice which may create turbulence in the distribution chamber 13.

To achieve the desired distribution of flow rate across the machine, the distribution of the stock may be observed. Where the flow is relatively too little, a finger 42 may be selectively inserted in a selected portion of the inlet end corresponding to the portion of the observed stream having too little flow. The insertion of a finger increases the velocity of the flow above the finger, drawing more of the suspension from the adjacent portions of the inlet section thus creating greater flow throughout the flow line corresponding to the region observed to be deficient.

The flow spreader as illustrated in FIGS. 1 to 6 has a 90° fan as shown particularly in FIG. 3. Other shapes of flow spreader are possible within the present invention. A 120° flow spreader may have the shape illustrated in FIGS. 7 and 8.

In FIG. 9 is shown another type of papermaking machine utilizing the flow spreader 10 of the present invention. The particular papermaking machine illustrated is known as a rotoformer and comprises a vacuum forming cylinder 68 and a rotoformer forming section 70. The forming section 70 includes an inlet end 72 to which the flow spreader 10 supplies the stock suspension.

It may be noted that in this papermaking machine, the outlet end 40 of the flow spreader 10 is followed directly by the forming section 70. For this reason, it is particularly important that the flow be not only evenly distributed across the width of the outlet end 40 of the flow spreader 10, but the flow must be substantially unidirectional. That is, all parts of the flow must be parallel to the other parts with substantially no lateral components of flow. The shape of the flow spreader, particularly the shape of the side plates 60 near the outlet end 40, directs the stream generally undirectionally straight out the end. However, it has been found that the action of the flow spreader sometimes tends to produce a divergence or convergence of the flow upon the exit of the stream from the flow spreader. To correct this condition a resistance gap section 74 may be interposed between the outlet end 40 of the flow spreader 10 and the inlet end 72 of the rotoformer unit.

A preferred form of this resistance gap section is illustrated in FIG. 10. The resistance gap section 74, as shown, is comprised of a circularly curved section 76 and a following relatively flat section 78 meeting along an edge 79 directed toward the bottom plate 80 of the resistance gap section 74, the bottom plate 80 being a continuation of the bottom plate 58 of the flow spreader 10. This produces an orifice or resistance gap 82 between the edge 79 and the bottom plate 80 as shown in FIG. 10. The resistance gap or orifice constricts the flow of the stock. This necessarily increases the velocity of the stock in the desired direction of the flow without imparting any additional component of velocity laterally. The lateral components are damped relative to the longitudinal flow, and when the flow expands following the orifice, the lateral components are virtually negligible. This is occasioned partially by the turbulence generated by the constriction and the subsequent expansion of flow cross section. The curved section 76 provides a smooth surface for changing the flow direction and thus does not permit any catching of the fibers on the resistance element. At the same time it produces a substantial change of direction of flow of a substantial portion of the stock stream thereby introducing substantial turbulence into the stock stream, as desired, as it flows into the forming section of the rotoformer.

The various embodiments particularly disclosed here may be changed or modified in various ways without departing from the scope of the invention. For example, other types of flow control members may be used. The flow spreader may be used with various other types of papermaking machine. The flow straightener 34 is not always needed. A purge line may be added to provide means for flushing the fingers 42 when necessary or desirable.

Further, other types of resistance gap may be utilized. Another such resistance gap section 74 is illustrated in FIGS. 11 and 12. In this instance a movable plate 84 produces the resistance gap 82 and serves the purpose of the curved section 76 shown in FIG. 10. A top plate 86 serves the purpose of flat section 78 shown in FIG. 10. The plate 84 is movable upon loosening the bolts 88 that secure it in place. The plate 84 may be shaped to modify the flow at the outlet end 40. By properly constricting the flow at the edges, lateral components may be reduced.

Various of the features of the invention are set forth in the following claims.

What is claimed is:

1. A method of controlling and widening the flow of a stream of suspended fibers and supplying the suspension in the widened stream to a papermaking machine, said method comprising supplying the suspension in a stream to the inlet end of a passage having a top, a bottom and sides defining a rectangular cross section, widening the stream within said passage in its direction of flow while gradually increasing the cross sectional area of said stream to produce at the outlet end of said passage a stream having a height small relative to its width, the width of said stream at said outlet end being approximately the width of the paper web to be formed, at the same time constraining the flow of suspension through said passage to a steady flow over a wide range of flow rates and suspension composition, and at respective selected positions transversely across the width of said inlet end selectively moving obstructions in or out of said stream toward or from said top or bottom to selected locations thereby selectively constricting the flow through said inlet end and selectively controlling the relative flow rate at said respective positions, whereby the flow rate is controlled at the corresponding steady flow lines at said outlet end.

2. A method according to claim 1 wherein said flow is made substantially unidirectional at said outlet end and said constricting produces a substantially equalized flow rate over substantially the entire width of the stream at said outlet end.

3. A method according to claim 2 wherein the flow of said stream is made turbulent as it leaves said outlet end.

4. In a flow control apparatus for widening a stream of suspended fibers and supplying the suspension in the widened stream to a papermaking machine, said flow control apparatus having top and bottom and side walls defining a passage having a rectangular cross section of area gradually increasing throughout its length and extending from an inlet end to an outlet end, the ratio of height to width decreasing in the direction of flow, said outlet end having a height small relative to its width, the width of said outlet end being approximately the width of the paper web to be formed, said side walls curving away from each other at the inlet end, and said top and bottom and side walls constraining the flow of suspension through said passage to a steady flow over a wide range of flow rates and suspension composition, flow constricting means disposed at said inlet end and selectively operable to constrict the flow through said inlet end at selected positions transversely across the width of said inlet end and thereby control the flow rate at said positions, said flow constricting means comprising a plurality of flow control members disposed side by side transversely across the width of said inlet end and separately movable in and out of the flow through said passage, and means for selectively operating said flow constricting means, whereby the flow rate is controlled at the corresponding steady flow lines at said outlet end.

5. Apparatus according to claim 4 wherein said flow control members are parallel fingers.

6. Apparatus according to claim 4 including means at said outlet end for creating turbulence in said stream.

7. Apparatus according to claim 4 wherein said flow constricting means comprise a plurality of parallel fingers disposed side by side transversely across the width of said inlet end and separately movable in and out of the flow through said passage and further including means at said outlet end for directing the flow unidirectionally from said outlet end and for creating turbulence in said stream at said outlet end.

8. Apparatus according to claim 4 including means at said outlet end for directing the flow in a single direction with substantially no lateral component of flow.

9. Apparatus according to claim 8 wherein said means at said outlet end is formed by a member partially closing said outlet end between top and bottom, thereby increasing the flow rate in the single direction of flow relative to any lateral components.

10. Apparatus according to claim 9 wherein said member is curved toward the stream to direct a portion of the stream of suspended fibers sharply across another portion thereof to create turbulence therein.

11. Apparatus according to claim 4 wherein said flow in said passage is directed only by said flow constricting means and by said top and bottom and side walls.

12. Apparatus according to claim 4 wherein said passage is entirely open between said inlet end and said outlet end.

13. A flow control apparatus for widening a stream of suspended fibers and supplying the suspension in the widened stream to a papermaking machine, said flow control apparatus comprising top and bottom and side walls defining a passage having a rectangular cross section of area gradually increasing throughout its length and extending from an inlet end to an outlet end, the ratio of height to width decreasing in the direction of flow, said outlet end having a height small relative to its width, the width of said outlet end being approximately the width of the paper web to be formed, said side walls curving away from each other at the inlet end, said top and bottom and side walls constraining the flow of suspension through said passage to a steady flow over a wide range of flow rates and suspension composition, said side walls being reversely curved at said outlet end to direct the flow therefrom in a single direction with substantially no lateral component of flow, flow constricting means disposed at said inlet end and selectively operable to constrict the flow through said inlet end at selected positions transversely across the width of said inlet end and thereby control the flow rate at said positions, said flow constricting means comprising a plurality of flow control members disposed side by side transversely across the width of said inlet end and separately movable in and out of the flow through said passage, and means for selectively operating said flow constricting means, whereby the flow rate is controlled at the corresponding steady flow lines at said outlet end.

14. Apparatus according to claim 13 wherein said top and bottom walls are substantially parallel at said inlet end and extend parallel to each other in the direction of flow over a portion of the chamber in which said side walls curve away from each other.

References Cited

UNITED STATES PATENTS

| | | | |
|---|---|---|---|
| 2,684,690 | 7/1954 | Lee | 162—343 XR |
| 2,788,719 | 4/1957 | Bennett | 162—336 XR |
| 3,309,264 | 3/1967 | Parkee et al. | 162—338 XR |

ARTHUR D. KELLOGG, Primary Examiner

R. H. TUSHIN, Assistant Examiner

U.S. Cl. X.R.

162—336, 343